US008903643B2

(12) United States Patent
Nielsen et al.

(10) Patent No.: US 8,903,643 B2
(45) Date of Patent: Dec. 2, 2014

(54) HAND-HELD MARKING APPARATUS WITH LOCATION TRACKING SYSTEM AND METHODS FOR LOGGING GEOGRAPHIC LOCATION OF SAME

(71) Applicant: CertusView Technologies, LLC, Palm Beach Gardens, FL (US)

(72) Inventors: Steven Nielsen, North Palm Beach, FL (US); Curtis Chambers, Palm Beach Gardens, FL (US); Jeffrey Farr, Tequesta, FL (US)

(73) Assignee: CertusView Technologies, LLC, Palm Beach Gardens, FL (US)

( * ) Notice: Subject to any disclaimer, the term of this patent is extended or adjusted under 35 U.S.C. 154(b) by 0 days.

(21) Appl. No.: 13/834,382

(22) Filed: Mar. 15, 2013

(65) Prior Publication Data

US 2014/0067263 A1   Mar. 6, 2014

Related U.S. Application Data

(63) Continuation of application No. 13/686,262, filed on Nov. 27, 2012, which is a continuation of application No. 12/639,041, filed on Dec. 16, 2009, now Pat. No. 8,407,001, which is a continuation of application No. 11/685,602, filed on Mar. 13, 2007, now Pat. No. 7,640,105.

(51) Int. Cl.
*G01C 15/02* (2006.01)
*G01C 21/00* (2006.01)
*G01S 5/02* (2010.01)
*G06Q 10/06* (2012.01)

(52) U.S. Cl.
CPC .......... *G06Q 10/06398* (2013.01); *G01C 21/00* (2013.01); *G01S 5/0294* (2013.01); *G01C 15/02* (2013.01)

USPC ............ 701/408; 701/33.4; 701/484; 404/93; 404/94; 342/357.2; 342/357.25; 702/5

(58) Field of Classification Search
USPC ...................... 701/468, 33.4, 408; 455/456.2; 427/136, 42.1; 404/75, 93, 94; 700/302; 702/5; 342/357.2, 357.25, 342/357.64, 357.63
See application file for complete search history.

(56) References Cited

U.S. PATENT DOCUMENTS 3,871,557 A   3/1975   Smrt
3,972,038 A   7/1976   Fletcher et al.
(Continued)

FOREIGN PATENT DOCUMENTS

CA   2636137   7/2007
CA   2623761   10/2008
(Continued)

OTHER PUBLICATIONS

Corrected Notice of Allowability dated May 10, 2013 from U.S. Appl. No. 12/797,227.
(Continued)

*Primary Examiner* — Thomas G Black
*Assistant Examiner* — Sara Nelson

(57) ABSTRACT

Marking apparatus and methods to mark ground, pavement or other surfaces to provide a visual indication of a presence or an absence of an underground utility in a dig area. An example marking tool has a hand-held housing, a marking dispenser coupled to the housing to dispense one or more markers in the dig area, and a triggering system to trigger the marking dispenser so as to dispense the marker(s). An example marking tool also may include a logging system to receive data associated with a marking event initiated by the triggering system, time tag the data, and store the time-tagged data in data storage in the marking tool.

21 Claims, 3 Drawing Sheets

(56) References Cited

U.S. PATENT DOCUMENTS

| | | |
|---|---|---|
| 3,974,491 A | 8/1976 | Sipe |
| 3,988,922 A | 11/1976 | Clark et al. |
| 4,016,748 A | 4/1977 | Boyens |
| 4,258,320 A | 3/1981 | Schonstedt |
| 4,387,340 A | 6/1983 | Peterman |
| 4,388,592 A | 6/1983 | Schonstedt |
| 4,520,317 A | 5/1985 | Peterman |
| 4,536,710 A | 8/1985 | Dunham |
| 4,539,522 A | 9/1985 | Schonstedt |
| 4,590,425 A | 5/1986 | Schonstedt |
| 4,623,282 A | 11/1986 | Allen |
| 4,639,674 A | 1/1987 | Rippingale |
| 4,712,094 A | 12/1987 | Bolson, Sr. |
| 4,747,207 A | 5/1988 | Schonstedt et al. |
| 4,803,773 A | 2/1989 | Schonstedt |
| 4,818,944 A | 4/1989 | Rippingale |
| 4,839,623 A | 6/1989 | Schonstedt et al. |
| 4,839,624 A | 6/1989 | Schonstedt |
| 4,873,533 A | 10/1989 | Oike |
| 4,899,293 A | 2/1990 | Dawson et al. |
| 4,989,151 A | 1/1991 | Nuimura |
| 5,006,806 A | 4/1991 | Rippingale et al. |
| 5,014,008 A | 5/1991 | Flowerdew |
| 5,017,873 A | 5/1991 | Rippingale et al. |
| 5,025,150 A | 6/1991 | Oldham et al. |
| 5,043,666 A | 8/1991 | Tavernetti et al. |
| 5,045,368 A | 9/1991 | Cosman et al. |
| 5,065,098 A | 11/1991 | Salsman et al. |
| 5,093,622 A | 3/1992 | Balkman |
| 5,097,211 A | 3/1992 | Schonstedt |
| 5,114,517 A | 5/1992 | Rippingale et al. |
| 5,122,750 A | 6/1992 | Rippingale et al. |
| 5,136,245 A | 8/1992 | Schonstedt |
| 5,138,761 A | 8/1992 | Schonstedt |
| 5,150,295 A | 9/1992 | Mattingly |
| 5,173,139 A | 12/1992 | Rippingale et al. |
| 5,206,065 A | 4/1993 | Rippingale et al. |
| 5,214,757 A | 5/1993 | Mauney et al. |
| 5,231,355 A | 7/1993 | Rider et al. |
| 5,239,290 A | 8/1993 | Schonstedt |
| 5,260,659 A | 11/1993 | Flowerdew et al. |
| 5,264,795 A | 11/1993 | Rider |
| 5,299,300 A | 3/1994 | Femal |
| 5,329,464 A | 7/1994 | Sumic et al. |
| 5,349,520 A | 9/1994 | Hickman |
| 5,361,029 A | 11/1994 | Rider |
| 5,365,163 A | 11/1994 | Satterwhite et al. |
| 5,373,298 A | 12/1994 | Karouby |
| 5,379,045 A | 1/1995 | Gilbert et al. |
| 5,381,338 A | 1/1995 | Wysocki |
| 5,389,149 A | 2/1995 | Carey et al. |
| 5,414,462 A | 5/1995 | Veatch |
| 5,430,379 A | 7/1995 | Parkinson et al. |
| 5,444,364 A | 8/1995 | Satterwhite et al. |
| 5,467,271 A | 11/1995 | Abel et al. |
| 5,469,155 A | 11/1995 | Archambeault |
| 5,471,143 A | 11/1995 | Doany |
| 5,486,067 A | 1/1996 | Huynh |
| 5,490,646 A | 2/1996 | Shaw |
| 5,517,419 A | 5/1996 | Lanckton |
| 5,519,329 A | 5/1996 | Satterwhite |
| 5,529,433 A | 6/1996 | Huynh |
| 5,530,357 A | 6/1996 | Cosman et al. |
| 5,543,931 A | 8/1996 | Lee et al. |
| 5,553,407 A | 9/1996 | Stump |
| 5,568,162 A | 10/1996 | Samsel et al. |
| 5,576,973 A | 11/1996 | Haddy |
| 5,621,325 A | 4/1997 | Draper et al. |
| 5,629,626 A | 5/1997 | Russell et al. |
| 5,644,237 A | 7/1997 | Eslambolchi et al. |
| 5,659,985 A | 8/1997 | Stump |
| 5,673,050 A | 9/1997 | Moussally et al. |
| 5,689,415 A | 11/1997 | Calotychos et al. |
| 5,699,244 A | 12/1997 | Clark, Jr. |
| 5,704,142 A | 1/1998 | Stump |
| 5,734,348 A * | 3/1998 | Aoki et al. ............... 342/357.31 |
| 5,739,785 A | 4/1998 | Allison et al. |
| 5,751,289 A | 5/1998 | Myers |
| 5,751,450 A | 5/1998 | Robinson |
| 5,764,127 A | 6/1998 | Hore et al. |
| 5,769,370 A | 6/1998 | Ashjaee |
| 5,815,411 A | 9/1998 | Ellenby |
| 5,819,859 A | 10/1998 | Stump et al. |
| 5,828,219 A | 10/1998 | Hanlon et al. |
| 5,848,373 A | 12/1998 | DeLorme et al. |
| 5,916,300 A | 6/1999 | Kirk et al. |
| 5,917,325 A | 6/1999 | Smith |
| 5,918,565 A | 7/1999 | Casas |
| 5,920,194 A | 7/1999 | Lewis et al. |
| 5,955,667 A | 9/1999 | Fyfe |
| 5,987,380 A | 11/1999 | Backman |
| 6,026,135 A | 2/2000 | McFee et al. |
| 6,031,454 A | 2/2000 | Lovejoy et al. |
| 6,032,530 A | 3/2000 | Hock |
| 6,037,010 A | 3/2000 | Kahmann et al. |
| 6,053,260 A | 4/2000 | Boon |
| 6,061,632 A | 5/2000 | Dreier |
| 6,064,940 A | 5/2000 | Rodgers |
| 6,074,693 A | 6/2000 | Manning |
| 6,075,481 A | 6/2000 | Eslambolchi et al. |
| 6,095,081 A | 8/2000 | Gochenour |
| 6,101,087 A | 8/2000 | Sutton |
| 6,107,801 A | 8/2000 | Hopwood |
| 6,119,376 A | 9/2000 | Stump |
| 6,127,827 A | 10/2000 | Lewis |
| 6,130,539 A | 10/2000 | Polak |
| 6,138,906 A | 10/2000 | DeMayo |
| 6,140,819 A | 10/2000 | Peterman et al. |
| 6,169,958 B1 | 1/2001 | Nagasamy et al. |
| 6,188,392 B1 | 2/2001 | O'Connor et al. |
| 6,188,777 B1 | 2/2001 | Darrell et al. |
| 6,206,282 B1 | 3/2001 | Hayes, Sr. et al. |
| 6,234,218 B1 | 5/2001 | Boers |
| 6,240,360 B1 | 5/2001 | Phelan |
| 6,268,731 B1 | 7/2001 | Hopwood et al. |
| 6,282,477 B1 | 8/2001 | Gudat et al. |
| 6,285,911 B1 | 9/2001 | Watts et al. |
| 6,292,108 B1 | 9/2001 | Straser et al. |
| 6,294,022 B1 | 9/2001 | Eslambolchi et al. |
| 6,297,736 B1 | 10/2001 | Lewis et al. |
| 6,299,934 B1 | 10/2001 | Manning |
| 6,308,565 B1 | 10/2001 | French et al. |
| 6,320,518 B2 | 11/2001 | Saeki et al. |
| 6,343,290 B1 | 1/2002 | Cossins |
| RE37,574 E | 3/2002 | Rawlins |
| 6,356,082 B1 | 3/2002 | Alkire et al. |
| 6,363,320 B1 | 3/2002 | Chou |
| 6,375,038 B1 | 4/2002 | Daansen et al. |
| 6,378,220 B1 | 4/2002 | Baioff et al. |
| 6,388,629 B1 | 5/2002 | Albats et al. |
| 6,390,336 B1 | 5/2002 | Orozco |
| 6,401,051 B1 | 6/2002 | Merriam |
| 6,407,550 B1 | 6/2002 | Parakulam et al. |
| 6,417,797 B1 | 7/2002 | Cousins et al. |
| 6,426,872 B1 | 7/2002 | Sutton |
| 6,437,708 B1 | 8/2002 | Brouwer |
| 6,438,239 B1 | 8/2002 | Kuchen |
| 6,459,266 B1 | 10/2002 | Fling |
| 6,476,708 B1 | 11/2002 | Johnson |
| 6,477,588 B1 | 11/2002 | Yerazunis |
| 6,490,524 B1 | 12/2002 | White et al. |
| 6,493,650 B1 | 12/2002 | Rodgers |
| 6,512,478 B1 | 1/2003 | Chien |
| 6,526,400 B1 | 2/2003 | Takata |
| 6,549,011 B2 | 4/2003 | Flatt |
| 6,552,548 B1 | 4/2003 | Lewis et al. |
| 6,585,133 B1 | 7/2003 | Brouwer |
| 6,600,420 B2 | 7/2003 | Goff et al. |
| 6,617,856 B1 | 9/2003 | Royle et al. |
| 6,633,163 B2 | 10/2003 | Fling |
| 6,650,293 B1 | 11/2003 | Eslambolchi |
| 6,650,798 B2 | 11/2003 | Russell et al. |
| 6,658,148 B1 | 12/2003 | Fung et al. |
| 6,674,276 B2 | 1/2004 | Morgan et al. |

(56) References Cited

U.S. PATENT DOCUMENTS

| | | |
|---|---|---|
| 6,700,526 B2 | 3/2004 | Witten |
| 6,710,741 B2 | 3/2004 | Tucker |
| 6,717,392 B2 | 4/2004 | Pearson |
| 6,723,375 B2 | 4/2004 | Zeck et al. |
| 6,728,662 B2 | 4/2004 | Frost et al. |
| 6,751,552 B1 | 6/2004 | Minelli |
| 6,751,553 B2 | 6/2004 | Young |
| 6,751,554 B1 | 6/2004 | Asher et al. |
| 6,777,923 B2 | 8/2004 | Pearson |
| 6,778,128 B2 | 8/2004 | Tucker et al. |
| 6,798,379 B2 | 9/2004 | Tucker et al. |
| 6,799,116 B2 | 9/2004 | Robbins |
| 6,815,953 B1 | 11/2004 | Bigelow |
| 6,819,109 B2 | 11/2004 | Sowers et al. |
| 6,825,775 B2 | 11/2004 | Fling et al. |
| 6,825,793 B2 | 11/2004 | Taylor, Jr. et al. |
| 6,833,795 B1 | 12/2004 | Johnson et al. |
| 6,833,811 B2 | 12/2004 | Zeitfuss et al. |
| 6,836,231 B2 | 12/2004 | Pearson |
| 6,845,171 B2 | 1/2005 | Shum et al. |
| 6,850,161 B1 | 2/2005 | Elliott et al. |
| 6,850,843 B2 * | 2/2005 | Smith et al. ............... 701/32.2 |
| 6,853,303 B2 | 2/2005 | Chen et al. |
| 6,853,905 B2 | 2/2005 | Barton |
| 6,865,484 B2 | 3/2005 | Miyasaka et al. |
| 6,895,356 B2 | 5/2005 | Brimhall et al. |
| 6,898,525 B1 | 5/2005 | Minelli |
| 6,898,550 B1 | 5/2005 | Blackadar et al. |
| 6,904,361 B1 | 6/2005 | Tallman et al. |
| 6,941,890 B1 | 9/2005 | Cristo et al. |
| 6,947,028 B2 | 9/2005 | Shkolnikov |
| 6,954,071 B2 | 10/2005 | Flatt et al. |
| 6,956,524 B2 | 10/2005 | Tucker et al. |
| 6,956,564 B1 | 10/2005 | Williams |
| 6,958,690 B1 | 10/2005 | Asher et al. |
| 6,968,296 B2 | 11/2005 | Royle |
| 6,972,698 B2 | 12/2005 | Deguchi |
| 6,975,942 B2 | 12/2005 | Young et al. |
| 6,977,508 B2 | 12/2005 | Pearson et al. |
| 6,992,584 B2 | 1/2006 | Dooley et al. |
| 6,993,088 B2 | 1/2006 | Fling et al. |
| 6,999,021 B2 | 2/2006 | Taylor, Jr. |
| 7,003,138 B2 | 2/2006 | Wilson |
| 7,009,399 B2 | 3/2006 | Olsson et al. |
| 7,009,519 B2 | 3/2006 | Leonard et al. |
| 7,038,454 B2 | 5/2006 | Gard et al. |
| 7,042,358 B2 | 5/2006 | Moore |
| 7,048,320 B2 | 5/2006 | Rubel |
| 7,053,789 B2 | 5/2006 | Fling et al. |
| 7,057,383 B2 | 6/2006 | Schlapp et al. |
| 7,062,414 B2 | 6/2006 | Waite et al. |
| 7,079,591 B2 | 7/2006 | Fling et al. |
| 7,091,872 B1 | 8/2006 | Bigelow et al. |
| 7,113,124 B2 | 9/2006 | Waite |
| 7,116,244 B2 | 10/2006 | Fling et al. |
| 7,120,564 B2 | 10/2006 | Pacey |
| 7,142,196 B1 | 11/2006 | Connor |
| 7,216,034 B2 | 5/2007 | Vitikainen |
| 7,235,980 B2 | 6/2007 | Pearson et al. |
| 7,236,863 B2 | 6/2007 | LaPorte et al. |
| 7,285,958 B2 | 10/2007 | Overby et al. |
| 7,304,480 B1 | 12/2007 | Pearson |
| 7,310,584 B2 | 12/2007 | Royle |
| 7,319,387 B2 * | 1/2008 | Willson et al. ........... 340/539.13 |
| 7,331,340 B2 | 2/2008 | Barney |
| 7,336,078 B1 | 2/2008 | Merewether et al. |
| 7,339,379 B2 | 3/2008 | Thompson et al. |
| 7,342,537 B2 | 3/2008 | Pearson et al. |
| 7,356,421 B2 | 4/2008 | Gudmundsson et al. |
| 7,358,738 B2 | 4/2008 | Overby et al. |
| 7,372,247 B1 * | 5/2008 | Giusti et al. ................. 324/67 |
| 7,372,276 B2 | 5/2008 | Mulcahey |
| 7,396,177 B2 | 7/2008 | Lapstun et al. |
| 7,396,178 B2 | 7/2008 | Lapstun et al. |
| 7,400,976 B2 | 7/2008 | Young et al. |
| 7,403,012 B2 | 7/2008 | Worsley et al. |
| 7,413,363 B2 | 8/2008 | Lapstun et al. |
| 7,443,154 B1 | 10/2008 | Merewether et al. |
| 7,447,509 B2 | 11/2008 | Cossins |
| 7,451,721 B1 | 11/2008 | Garza et al. |
| 7,482,973 B2 | 1/2009 | Tucker et al. |
| 7,498,816 B1 | 3/2009 | Olsson et al. |
| 7,500,583 B1 * | 3/2009 | Cox ........................ 222/402.1 |
| 7,532,127 B2 | 5/2009 | Holman et al. |
| 7,636,901 B2 | 12/2009 | Munson |
| 7,640,105 B2 | 12/2009 | Nielsen et al. |
| 7,664,530 B2 | 2/2010 | Skelton |
| 7,730,095 B2 | 6/2010 | Vishwanath et al. |
| 7,733,077 B1 | 6/2010 | Merewether et al. |
| 7,773,095 B1 | 8/2010 | Badrak et al. |
| 7,834,801 B2 | 11/2010 | Waite et al. |
| 7,834,806 B2 | 11/2010 | Tucker et al. |
| 7,889,124 B2 * | 2/2011 | Islam et al. ................ 342/357.2 |
| 7,889,888 B2 | 2/2011 | Deardorff |
| 7,929,981 B2 | 4/2011 | Sangberg |
| 7,978,129 B2 | 7/2011 | Sawyer et al. |
| 7,986,246 B2 | 7/2011 | Angelis et al. |
| 7,990,151 B2 | 8/2011 | Olsson |
| 8,060,304 B2 | 11/2011 | Nielsen et al. |
| 8,068,789 B2 | 11/2011 | Bell et al. |
| 8,069,412 B2 | 11/2011 | Bankston et al. |
| 8,081,112 B2 | 12/2011 | Tucker et al. |
| 8,106,660 B1 | 1/2012 | Merewether et al. |
| 8,118,192 B2 | 2/2012 | Daugherty |
| 8,144,245 B2 | 3/2012 | Vik |
| 8,155,390 B2 | 4/2012 | Nielsen et al. |
| 8,194,932 B2 | 6/2012 | Nielsen et al. |
| 8,218,827 B2 | 7/2012 | Nielsen et al. |
| 8,249,306 B2 | 8/2012 | Nielsen et al. |
| 8,260,489 B2 | 9/2012 | Nielsen et al. |
| 8,264,409 B2 | 9/2012 | Miller |
| 8,265,344 B2 | 9/2012 | Nielsen et al. |
| 8,270,666 B2 | 9/2012 | Nielsen et al. |
| 8,280,117 B2 | 10/2012 | Nielsen et al. |
| 8,280,631 B2 | 10/2012 | Nielsen et al. |
| 8,280,969 B2 | 10/2012 | Nielsen et al. |
| 8,290,204 B2 | 10/2012 | Nielsen et al. |
| 8,290,215 B2 | 10/2012 | Nielsen et al. |
| 8,296,308 B2 | 10/2012 | Nielsen et al. |
| 8,300,895 B2 | 10/2012 | Nielsen et al. |
| 8,301,380 B2 | 10/2012 | Nielsen et al. |
| 8,311,765 B2 | 11/2012 | Nielsen et al. |
| 8,340,359 B2 | 12/2012 | Nielsen et al. |
| 8,355,542 B2 | 1/2013 | Nielsen et al. |
| 8,356,255 B2 | 1/2013 | Nielsen et al. |
| 8,361,543 B2 | 1/2013 | Nielsen et al. |
| 8,374,789 B2 | 2/2013 | Nielsen et al. |
| 8,384,742 B2 | 2/2013 | Nielsen et al. |
| 8,386,178 B2 | 2/2013 | Nielsen et al. |
| 8,400,155 B2 | 3/2013 | Nielsen et al. |
| 8,401,791 B2 | 3/2013 | Nielsen et al. |
| 8,407,001 B2 | 3/2013 | Nielsen et al. |
| 8,416,995 B2 | 4/2013 | Nielsen et al. |
| 8,473,148 B2 | 6/2013 | Nielsen et al. |
| 8,480,332 B2 | 7/2013 | Miller |
| 8,532,341 B2 | 9/2013 | Nielsen et al. |
| 8,543,937 B2 | 9/2013 | Nielsen et al. |
| 8,577,707 B2 | 11/2013 | Nielsen et al. |
| 8,589,201 B2 | 11/2013 | Nielsen et al. |
| 8,589,202 B2 | 11/2013 | Nielsen et al. |
| 8,612,090 B2 | 12/2013 | Nielsen et al. |
| 8,612,148 B2 | 12/2013 | Nielsen et al. |
| 8,612,271 B2 | 12/2013 | Nielsen et al. |
| 8,612,276 B1 | 12/2013 | Nielsen et al. |
| 8,630,463 B2 | 1/2014 | Nielsen et al. |
| 2001/0029996 A1 | 10/2001 | Robinson |
| 2002/0035432 A1 | 3/2002 | Kubica et al. |
| 2002/0052755 A1 | 5/2002 | Whatley |
| 2002/0053608 A1 | 5/2002 | Zeck et al. |
| 2002/0103625 A1 | 8/2002 | Card et al. |
| 2002/0115472 A1 | 8/2002 | Andress |
| 2002/0122000 A1 | 9/2002 | Bradley et al. |
| 2002/0130806 A1 * | 9/2002 | Taylor et al. .................... 342/22 |
| 2002/0130906 A1 | 9/2002 | Miyaki |

(56) References Cited

U.S. PATENT DOCUMENTS

| | | |
|---|---|---|
| 2002/0190718 A1 | 12/2002 | Gard et al. |
| 2003/0012411 A1 | 1/2003 | Sjostrom |
| 2003/0058164 A1* | 3/2003 | Zhdanov et al. ......... 342/357.17 |
| 2003/0080897 A1 | 5/2003 | Tranchina |
| 2003/0083073 A1 | 5/2003 | Cossins |
| 2003/0100316 A1 | 5/2003 | Odamura |
| 2003/0135328 A1 | 7/2003 | Burns et al. |
| 2003/0168834 A1 | 9/2003 | Ulrich |
| 2003/0184300 A1 | 10/2003 | Bigelow |
| 2003/0196585 A1 | 10/2003 | McDonald et al. |
| 2004/0006425 A1 | 1/2004 | Wood |
| 2004/0041892 A1 | 3/2004 | Yoneyama et al. |
| 2004/0051368 A1 | 3/2004 | Caputo |
| 2004/0057795 A1 | 3/2004 | Mayfield et al. |
| 2004/0070535 A1 | 4/2004 | Olsson et al. |
| 2004/0124988 A1 | 7/2004 | Leonard et al. |
| 2004/0168358 A1 | 9/2004 | Stump |
| 2004/0203909 A1 | 10/2004 | Koster |
| 2004/0210370 A1 | 10/2004 | Gudat |
| 2004/0220731 A1 | 11/2004 | Tucker |
| 2004/0225444 A1 | 11/2004 | Young et al. |
| 2004/0260720 A1 | 12/2004 | Cossins |
| 2005/0004944 A1 | 1/2005 | Cossins |
| 2005/0023367 A1 | 2/2005 | Reighard |
| 2005/0033513 A1 | 2/2005 | Gasbarro |
| 2005/0034074 A1 | 2/2005 | Munson |
| 2005/0038825 A1 | 2/2005 | Tarabzouni |
| 2005/0040222 A1 | 2/2005 | Robinson et al. |
| 2005/0054457 A1 | 3/2005 | Eyestone et al. |
| 2005/0055142 A1 | 3/2005 | Mcmurtry et al. |
| 2005/0057745 A1 | 3/2005 | Bontje |
| 2005/0150399 A1 | 7/2005 | Wiley |
| 2005/0156600 A1 | 7/2005 | Olsson |
| 2005/0192727 A1 | 9/2005 | Shostak et al. |
| 2005/0206562 A1 | 9/2005 | Willson et al. |
| 2005/0232475 A1 | 10/2005 | Floeder |
| 2005/0251331 A1 | 11/2005 | Kreft |
| 2005/0278371 A1 | 12/2005 | Funk et al. |
| 2006/0026020 A1 | 2/2006 | Waite et al. |
| 2006/0055584 A1* | 3/2006 | Waite et al. ..................... 342/22 |
| 2006/0077095 A1 | 4/2006 | Tucker et al. |
| 2006/0085133 A1 | 4/2006 | Young |
| 2006/0085396 A1 | 4/2006 | Evans |
| 2006/0109131 A1 | 5/2006 | Sen et al. |
| 2006/0161349 A1 | 7/2006 | Cross |
| 2006/0169776 A1 | 8/2006 | Hornbaker |
| 2006/0220955 A1 | 10/2006 | Hamilton |
| 2006/0244454 A1 | 11/2006 | Gard |
| 2006/0254820 A1 | 11/2006 | Gard et al. |
| 2006/0262963 A1 | 11/2006 | Navulur |
| 2006/0276198 A1 | 12/2006 | Michelon |
| 2006/0276985 A1 | 12/2006 | Xu |
| 2006/0282191 A1 | 12/2006 | Gotfried |
| 2006/0282280 A1 | 12/2006 | Stotz et al. |
| 2006/0285913 A1 | 12/2006 | Koptis |
| 2006/0287900 A1 | 12/2006 | Fiore |
| 2006/0289679 A1 | 12/2006 | Johnson et al. |
| 2007/0013379 A1 | 1/2007 | Staples et al. |
| 2007/0018632 A1 | 1/2007 | Royle |
| 2007/0031042 A1 | 2/2007 | Simental |
| 2007/0040558 A1 | 2/2007 | Overby et al. |
| 2007/0100496 A1* | 5/2007 | Forell ........................ 700/245 |
| 2007/0143676 A1 | 6/2007 | Chen |
| 2007/0219722 A1 | 9/2007 | Sawyer, Jr. |
| 2007/0223803 A1 | 9/2007 | Shindo |
| 2007/0268110 A1 | 11/2007 | Litte |
| 2007/0286021 A1 | 12/2007 | Hoenmans et al. |
| 2007/0288195 A1 | 12/2007 | Waite et al. |
| 2008/0010009 A1 | 1/2008 | Miyoshi |
| 2008/0013940 A1 | 1/2008 | Jung |
| 2008/0109751 A1 | 5/2008 | Fitzmaurice et al. |
| 2008/0125942 A1* | 5/2008 | Tucker et al. ................... 701/50 |
| 2008/0180322 A1 | 7/2008 | Islam |
| 2008/0204322 A1 | 8/2008 | Oswald et al. |
| 2008/0208415 A1 | 8/2008 | Vik |
| 2008/0255795 A1 | 10/2008 | Shkolnikov |
| 2008/0310721 A1 | 12/2008 | Yang |
| 2009/0004410 A1 | 1/2009 | Thomson et al. |
| 2009/0055719 A1 | 2/2009 | Cossins |
| 2009/0063258 A1 | 3/2009 | Mueller et al. |
| 2009/0085568 A1 | 4/2009 | Cole |
| 2009/0109081 A1 | 4/2009 | Ryerson |
| 2009/0121933 A1 | 5/2009 | Tucker et al. |
| 2009/0171616 A1 | 7/2009 | Zhang et al. |
| 2009/0185858 A1 | 7/2009 | Malit |
| 2009/0201311 A1 | 8/2009 | Nielsen et al. |
| 2009/0202101 A1 | 8/2009 | Nielsen et al. |
| 2009/0204238 A1 | 8/2009 | Nielsen et al. |
| 2009/0204466 A1 | 8/2009 | Nielsen et al. |
| 2009/0204625 A1* | 8/2009 | Chambers et al. ............ 707/101 |
| 2009/0207019 A1 | 8/2009 | Nielsen et al. |
| 2009/0208642 A1 | 8/2009 | Nielsen et al. |
| 2009/0210098 A1 | 8/2009 | Nielsen et al. |
| 2009/0210245 A1 | 8/2009 | Wold |
| 2009/0210284 A1 | 8/2009 | Nielsen et al. |
| 2009/0210285 A1 | 8/2009 | Nielsen et al. |
| 2009/0210298 A1 | 8/2009 | Nielsen et al. |
| 2009/0238415 A1 | 9/2009 | Nielsen et al. |
| 2009/0324815 A1 | 12/2009 | Nielsen et al. |
| 2009/0327024 A1 | 12/2009 | Nielsen et al. |
| 2010/0006667 A1 | 1/2010 | Nielsen et al. |
| 2010/0010862 A1 | 1/2010 | Nielsen et al. |
| 2010/0010863 A1 | 1/2010 | Nielsen et al. |
| 2010/0010882 A1 | 1/2010 | Nielsen et al. |
| 2010/0010883 A1 | 1/2010 | Nielsen et al. |
| 2010/0045517 A1 | 2/2010 | Tucker et al. |
| 2010/0070347 A1 | 3/2010 | Chen |
| 2010/0084532 A1 | 4/2010 | Nielsen et al. |
| 2010/0085694 A1 | 4/2010 | Nielsen et al. |
| 2010/0085701 A1 | 4/2010 | Nielsen et al. |
| 2010/0086671 A1 | 4/2010 | Nielsen et al. |
| 2010/0088031 A1 | 4/2010 | Nielsen et al. |
| 2010/0088032 A1 | 4/2010 | Nielsen et al. |
| 2010/0088134 A1 | 4/2010 | Nielsen et al. |
| 2010/0088135 A1 | 4/2010 | Nielsen et al. |
| 2010/0088164 A1 | 4/2010 | Nielsen et al. |
| 2010/0090700 A1 | 4/2010 | Nielsen et al. |
| 2010/0097224 A1 | 4/2010 | Prodanovich |
| 2010/0117654 A1 | 5/2010 | Nielsen et al. |
| 2010/0131903 A1 | 5/2010 | Thomson et al. |
| 2010/0146454 A1 | 6/2010 | Sugahara |
| 2010/0161359 A1 | 6/2010 | Asher |
| 2010/0188088 A1 | 7/2010 | Nielsen et al. |
| 2010/0188215 A1 | 7/2010 | Nielsen et al. |
| 2010/0188216 A1 | 7/2010 | Nielsen et al. |
| 2010/0188245 A1 | 7/2010 | Nielsen et al. |
| 2010/0188407 A1 | 7/2010 | Nielsen et al. |
| 2010/0189312 A1 | 7/2010 | Nielsen et al. |
| 2010/0189887 A1 | 7/2010 | Nielsen et al. |
| 2010/0198663 A1 | 8/2010 | Nielsen et al. |
| 2010/0201690 A1 | 8/2010 | Nielsen et al. |
| 2010/0205031 A1 | 8/2010 | Nielsen et al. |
| 2010/0205032 A1 | 8/2010 | Nielsen et al. |
| 2010/0205264 A1 | 8/2010 | Nielsen et al. |
| 2010/0205536 A1 | 8/2010 | Nielsen et al. |
| 2010/0205554 A1 | 8/2010 | Nielsen et al. |
| 2010/0207816 A1 | 8/2010 | Islam et al. |
| 2010/0211354 A1 | 8/2010 | Park et al. |
| 2010/0228588 A1 | 9/2010 | Nielsen et al. |
| 2010/0245086 A1 | 9/2010 | Nielsen et al. |
| 2010/0247754 A1 | 9/2010 | Nielsen et al. |
| 2010/0253511 A1 | 10/2010 | Nielsen et al. |
| 2010/0253513 A1 | 10/2010 | Nielsen et al. |
| 2010/0253514 A1 | 10/2010 | Nielsen et al. |
| 2010/0255182 A1 | 10/2010 | Nielsen et al. |
| 2010/0256825 A1 | 10/2010 | Nielsen et al. |
| 2010/0256912 A1 | 10/2010 | Nielsen et al. |
| 2010/0256981 A1 | 10/2010 | Nielsen et al. |
| 2010/0257029 A1 | 10/2010 | Nielsen et al. |
| 2010/0257477 A1 | 10/2010 | Nielsen et al. |
| 2010/0259381 A1 | 10/2010 | Nielsen et al. |
| 2010/0259414 A1 | 10/2010 | Nielsen et al. |
| 2010/0262470 A1 | 10/2010 | Nielsen et al. |
| 2010/0262670 A1 | 10/2010 | Nielsen et al. |

(56) References Cited

U.S. PATENT DOCUMENTS

| | | |
|---|---|---|
| 2010/0263591 A1 | 10/2010 | Nielsen et al. |
| 2010/0272885 A1* | 10/2010 | Olsson et al. ............... 427/137 |
| 2010/0285211 A1 | 11/2010 | Nielsen et al. |
| 2010/0318401 A1 | 12/2010 | Nielsen et al. |
| 2010/0318402 A1 | 12/2010 | Nielsen et al. |
| 2010/0318465 A1 | 12/2010 | Nielsen et al. |
| 2010/0324967 A1 | 12/2010 | Nielsen et al. |
| 2011/0007076 A1 | 1/2011 | Nielsen et al. |
| 2011/0020776 A1 | 1/2011 | Nielsen et al. |
| 2011/0022433 A1 | 1/2011 | Nielsen et al. |
| 2011/0035245 A1 | 2/2011 | Nielsen et al. |
| 2011/0035251 A1 | 2/2011 | Nielsen et al. |
| 2011/0035252 A1 | 2/2011 | Nielsen et al. |
| 2011/0035260 A1 | 2/2011 | Nielsen et al. |
| 2011/0035324 A1 | 2/2011 | Nielsen et al. |
| 2011/0035328 A1 | 2/2011 | Nielsen et al. |
| 2011/0040589 A1 | 2/2011 | Nielsen et al. |
| 2011/0040590 A1 | 2/2011 | Nielsen et al. |
| 2011/0045175 A1 | 2/2011 | Nielsen et al. |
| 2011/0046993 A1 | 2/2011 | Nielsen et al. |
| 2011/0046994 A1 | 2/2011 | Nielsen et al. |
| 2011/0046999 A1 | 2/2011 | Nielsen et al. |
| 2011/0060496 A1 | 3/2011 | Nielsen et al. |
| 2011/0060549 A1 | 3/2011 | Nielsen et al. |
| 2011/0093162 A1 | 4/2011 | Nielsen et al. |
| 2011/0093304 A1 | 4/2011 | Nielsen et al. |
| 2011/0093306 A1 | 4/2011 | Nielsen et al. |
| 2011/0095885 A9 | 4/2011 | Nielsen et al. |
| 2011/0117272 A1 | 5/2011 | Nielsen et al. |
| 2011/0131081 A1 | 6/2011 | Nielsen et al. |
| 2011/0137769 A1 | 6/2011 | Nielsen et al. |
| 2011/0236588 A1 | 9/2011 | Nielsen et al. |
| 2011/0249394 A1 | 10/2011 | Nielsen et al. |
| 2011/0279229 A1 | 11/2011 | Nielsen et al. |
| 2011/0279230 A1 | 11/2011 | Nielsen et al. |
| 2011/0279476 A1 | 11/2011 | Nielsen et al. |
| 2011/0283217 A1 | 11/2011 | Nielsen et al. |
| 2011/0285749 A1 | 11/2011 | Nielsen et al. |
| 2012/0019380 A1 | 1/2012 | Nielsen et al. |
| 2012/0036140 A1 | 2/2012 | Nielsen et al. |
| 2012/0065924 A1 | 3/2012 | Nielsen et al. |
| 2012/0065944 A1 | 3/2012 | Nielsen et al. |
| 2012/0066137 A1 | 3/2012 | Nielsen et al. |
| 2012/0066273 A1 | 3/2012 | Nielsen et al. |
| 2012/0066506 A1 | 3/2012 | Nielsen et al. |
| 2012/0069178 A1 | 3/2012 | Nielsen et al. |
| 2012/0072035 A1 | 3/2012 | Nielsen et al. |
| 2012/0110019 A1 | 5/2012 | Nielsen et al. |
| 2012/0113244 A1 | 5/2012 | Nielsen et al. |
| 2012/0274476 A1 | 11/2012 | Nielsen et al. |
| 2012/0328162 A1 | 12/2012 | Nielsen et al. |
| 2012/0330849 A1 | 12/2012 | Nielsen et al. |
| 2013/0002854 A1 | 1/2013 | Nielsen et al. |
| 2013/0006718 A1 | 1/2013 | Nielsen et al. |
| 2013/0044918 A1 | 2/2013 | Nielsen et al. |
| 2013/0085670 A1 | 4/2013 | Nielsen et al. |
| 2013/0103318 A1 | 4/2013 | Nielsen et al. |
| 2013/0135343 A1 | 5/2013 | Nielsen et al. |
| 2013/0147637 A1 | 6/2013 | Nielsen et al. |
| 2013/0174072 A9 | 7/2013 | Nielsen et al. |
| 2013/0186333 A1 | 7/2013 | Nielsen et al. |
| 2013/0194303 A1 | 8/2013 | Nielsen et al. |
| 2013/0231984 A1 | 9/2013 | Nielsen et al. |
| 2013/0233883 A1 | 9/2013 | Nielsen et al. |
| 2013/0251894 A1 | 9/2013 | Nielsen et al. |
| 2013/0265138 A1 | 10/2013 | Nielsen et al. |
| 2013/0268199 A1 | 10/2013 | Nielsen et al. |
| 2013/0287500 A1 | 10/2013 | Miller |
| 2013/0315449 A1 | 11/2013 | Nielsen et al. |
| 2014/0022272 A1 | 1/2014 | Nielsen et al. |
| 2014/0035587 A1 | 2/2014 | Nielsen et al. |
| 2014/0074970 A1 | 3/2014 | Nielsen et al. |

FOREIGN PATENT DOCUMENTS

| | | |
|---|---|---|
| CA | 2623466 | 6/2011 |
| CH | 695087 A5 | 12/2005 |
| EP | 0636393 | 2/1995 |
| EP | 1521331 | 4/2005 |
| EP | 1852365 | 11/2007 |
| EP | 1974638 | 10/2008 |
| GB | 2266863 | 11/1993 |
| JP | 7256169 | 10/1994 |
| JP | 7128061 | 5/1995 |
| JP | 8285601 | 11/1996 |
| JP | 10060865 | 3/1998 |
| JP | 2000501666 | 2/2000 |
| JP | 2002079167 | 3/2002 |
| WO | WO9112119 | 8/1991 |
| WO | WO9424584 | 10/1994 |
| WO | WO9516827 | 6/1995 |
| WO | WO9629572 | 9/1996 |
| WO | WO9854600 | 12/1998 |
| WO | WO9854601 | 12/1998 |
| WO | WO9900679 | 1/1999 |
| WO | WO0194016 | 12/2001 |
| WO | WO0228541 | 4/2002 |
| WO | WO2004100044 | 11/2004 |
| WO | WO2004102242 | 11/2004 |
| WO | WO2005052627 | 6/2005 |
| WO | WO2006015310 | 2/2006 |
| WO | WO2006136776 | 12/2006 |
| WO | WO2006136777 | 12/2006 |
| WO | WO2007067898 | 6/2007 |
| WO | WO2008112461 | 9/2008 |

OTHER PUBLICATIONS

Corrected Notice of Allowability from U.S. Appl. No. 12/364,369 dated Apr. 15, 2013.
Corrected Notice of Allowability from U.S. Appl. No. 12/622,768 dated Apr. 3, 2013.
Corrected Notice of Allowability from U.S. Appl. No. 12/703,958 dated Apr. 18, 2013.
Corrected Notice of Allowability from U.S. Appl. No. 12/797,202 dated Apr. 4, 2013.
Corrected Notice of Allowability from U.S. Appl. No. 12/797,227 dated Apr. 17, 2013.
Notice of Allowance dated Mar. 28, 2013 from U.S. Appl. No. 12/797,227.
Notice of Allowance dated Apr. 25, 2013 from U.S. Appl. No. 12/364,359.
Notice of Allowance dated May 10, 2013 from U.S. Appl. No. 12/797,243.
Office Action dated Feb. 26, 2013 from Canadian Application No. 2,738,968.
Office Action dated Mar. 13, 2013 from Chinese Application No. 201080045879.1.
Office Action dated Mar. 25, 2013 from U.S. Appl. No. 12/797,211.
Office Action dated Mar. 28, 2013 from U.S. Appl. No. 12/571,408.
Office Action dated Apr. 26, 2013 from U.S. Appl. No. 12/859,394.
Office Action dated May 10, 2013 from U.S. Appl. No. 12/786,929.
Corrected Notice of Allowability dated May 13, 2013 from U.S. Appl. No. 12/429,929.
Corrected Notice of Allowability dated May 14, 2013 from U.S. Appl. No. 12/797,202.
U.S. Appl. No. 13/686,262, filed Nov. 27, 2012, Nielsen et al.
U.S. Appl. No. 13/751,862, filed Jan. 28, 2013, Nielsen et al.
U.S. Appl. No. 13/795,337, filed Mar. 12, 2013, Nielsen et al.
U.S. Appl. No. 13/797,229, filed Mar. 12, 2013, Nielsen et al.
U.S. Appl. No. 13/846,120, filed Mar. 18, 2013, Nielsen et al.
3M Dynatel, Brochure, 2006, 1-4.
3M Dynatel, Locating and Marking System, Brochure, 2007, 1-16.
ArcFM, White Paper, 2006, 1-28.
ArcGIS 9, Geocoding in ArcGIS, Manual, 2004, 1-192.
ArcPad, Mobile GIS Software for Field Mapping Applications, brochure, 2006, http:/www.esri.com/library/brochures/pdfs/arcpadbro.pdf.

(56) References Cited

OTHER PUBLICATIONS

ArcPad: Mobile GIS, ESRI White Paper, Sep. 2004, 1-17, http://www.esri.com/library/whitepapers/pdfs/arcpad.pdf.
Bearden, T., "New Identification Technology Raises Concerns over Privacy," PBS Online NewsHour Report, Aug. 17, 2006, pp. 1-5, http://www.pbs.org/newshour/bb/science/july-dec06/rfid_08-17.html.
Bernold, L.. et al. "Equipment operator training in the age of internet2," Proceedings of 19th International Symposium on Automation and Robotics in Construction (ISARC 2002), Sep. 2002 [retrieved on Nov. 12, 2010]. Retrieved from the Internet: <URL: http://fire.nist.gov/bfrlpubsibuild02IPDF/b02059.pdf>. p4, col. 2, para 2.
Carey, B., "Tracking Shoes," Chicago Tribune Online Edition, Jan. 29, 2007, pp. 1-3, http://www.chicagotribune.com/services/site/premium/access-registered.intercept.
CGA, Common Ground Alliance, Best Practices, Version 1.0, Apr. 2003, 93 pages.
CGA, Common Ground, Study of One-Call Systems and Damage Prevention Best Practices, Aug. 1999, 262 pages.
DigiTerra Explorer, brochure, v. 6, 2009, 1-2.
DigiTerra Explorer, User Manual, v. 5, 2007, 1-64.
Dockter, L., Development of an Underground Utility Damage Prevention Plan (UUDPP) for Company XYZ, The Graduate College, University of Wisconsin-Stout, 2008, http://www2.uwstout.edu/content/lib/thesis/2008/2008dockterl.pdf.
ESRI Corporate Introduction, http://www.esri.com/library/brochures/pdfs/corporate-intro.pdf, printed on Dec. 9, 2009 (original publication date unknown).
European Search Report, Application No. 08743671.3, Nov. 16, 2011.
European Search Report, Application No. 08743673.9, Feb. 28, 2011.
Fox, G. et al., "GPS Provides Quick, Accurate Data for Underground Utility Location," as featured in Apr. 2002 issue of Trenchless Technology, http://www.woolpert.com/asp/articles/GPS-Provides.asp, Sep. 14, 2007, pp. 1 and 2.
GPS Technology Enhancing Underground Utility Locating, Underground Construction Magazine, Apr. 7, 2010, 4 pages, http://www.undergroundconstructionmagazine.com/print/1034?page=show.
International Search Report and Written Opinion, Application No. PCT/2010/000389, Jun. 2, 2010.
International Search Report and Written Opinion, Application No. PCT/US10/45161, Oct. 29, 2010.
International Search Report and Written Opinion, Application No. PCT/US10/45409, Nov. 18, 2010.
International Search Report and Written Opinion, Application No. PCT/US10/45969, Nov. 18, 2010.
International Search Report and Written Opinion, Application No. PCT/US2008/55796, Oct. 14, 2008.
International Search Report and Written Opinion, Application No. PCT/US2008/55798, Jul. 28, 2008.
International Search Report and Written Opinion, Application No. PCT/US2009/000859, Apr. 14, 2009.
International Search Report and Written Opinion, Application No. PCT/US2009/003957, Mar. 21, 2011.
International Search Report and Written Opinion, Application No. PCT/US2009/005299, Dec. 22, 2009.
International Search Report and Written Opinion, Application No. PCT/US2009/005348, Mar. 2, 2010.
International Search Report and Written Opinion, Application No. PCT/US2009/005359, Feb. 8, 2010.
International Search Report and Written Opinion, Application No. PCT/US2010/036029, Sep. 3, 2010.
International Search Report and Written Opinion, Application No. PCT/US2011/047807, Dec. 6, 2011.
Jung, H.G., Structure Analysis Based Parking Slot Marking Recognition for Semi-automatic Parking System, Springer-Verlag Berlin Heidelberg 2006, 10 pages.
Luczak, S., "Increasing Accuracy of Tilt Measurements," Engineering Mechanics, vol. 14, 2007, p. 143-154.
MALA Application Note—Using MALA GPR systems with GPS equipment, Printed Matter No. 2894, 5 pages, www.malags.se, printed Apr. 9, 2010 (original publication date unknown).
MALA Application Note—Visualizing GPR data in Google Earth using MALA GPS Mapper, Printed Matter No. 2896, 3 pages, www.malags.se, printed Apr. 9, 2010 (original publication date unknown).
MALA GPS Mapper—Processing, 1 page, http://www.malags.se/Downloads/Software/processing/MALA-GPS-Mapper.aspx, printed on Apr. 9, 2010 (original publication date unknown).
MALA GPS Mapper—Product Releases, Sep. 19, 2007, 1 page, http://www.malags.se/News-and-Events/Product-Releases/MALA-GPS-Mapper.aspx, printed Apr. 9, 2010.
MALA Object Mapper™—Processing, 1 page, http://www.malags.se/Downloads/Software/Processing/Object-Mapper.aspx, printed Apr. 9, 2010 (original publication date unknown).
MobileMapper 6 vs. Juno SS in Real World Conditions, White Paper, 2009 1-16, http://www.sidwellco.com/php/gps_solutions/docs/MM6_vs_Juno_WP_en.pdf.
MobileMapper 6, brochure, 2008, 1-4.
New Mexico's Recommended Marking Guidelines for Underground Utilities, May 2006, 8 pages.
Notice of Allowance dated Jan. 8, 2013 from U.S. Appl. No. 12/797,243.
Notice of Allowance dated Jan. 16, 2013 from U.S. Appl. No. 12/609,275.
Notice of Allowance dated Jan. 22, 2013 from U.S. Appl. No. 12/703,958.
Notice of Allowance dated Jan. 24, 2012 from U.S. Appl. No. 12/363,951.
Notice of Allowance dated Feb. 1, 2013 from U.S. Appl. No. 12/797,202.
Notice of Allowance dated Feb. 13, 2013 from U.S. Appl. No. 12/701,447.
Notice of Allowance dated Feb. 20, 2013 from U.S. Appl. No. 12/364,369.
Notice of Allowance dated Mar. 9, 2012 from U.S. Appl. No. 12/236,688.
Notice of Allowance dated May 2, 2012 from U.S. Appl. No. 12/429,929.
Notice of Allowance dated Jul. 12, 2012 from U.S. Appl. No. 12/539,497.
Notice of Allowance dated Aug. 1, 2012 from U.S. Appl. No. 12/364,339.
Notice of Allowance dated Aug. 25, 2011 from U.S. Appl. No. 11/696,606.
Notice of Allowance dated Sep. 5, 2012 from U.S. Appl. No. 12/854,370.
Notice of Allowance dated Oct. 1, 2012 from U.S. Appl. No. 12/607,843.
Notice of Allowance dated Oct. 17, 2012 from U.S. Appl. No. 12/236,688.
Notice of Allowance dated Oct. 25, 2012 from U.S. Appl. No. 12/639,373.
Notice of Allowance dated Nov. 6, 2009 from U.S. Appl. No. 11/685,602.
Notice of Allowance dated Nov. 7, 2012 from U.S. Appl. No. 12/639,041.
Notice of Allowance dated Dec. 12, 2012 from U.S. Appl. No. 12/703,958.
Notice of Allowance dated Dec. 21, 2012 from U.S. Appl. No. 12/364,339.
Notice of Allowance dated Mar. 12, 2013 from U.S. Appl. No. 12/429,929.
Notice of Allowance dated Apr. 28, 2011 from U.S. Appl. No. 29/356,631.
Notice of Allowance dated Jan. 25, 2012 from Canadian Application No. 2,710,189.
Notice of Allowance dated Nov. 12, 2010 from U.S. Appl. No. 29/356,633.
Notice of Allowance dated Nov. 12, 2010 from U.S. Appl. No. 29/356,634.

(56) References Cited

OTHER PUBLICATIONS

Notice of Allowance dated Nov. 12, 2010 from U.S. Appl. No. 29/356,635.
Notice of Allowance dated Nov. 28, 2011 from Canadian Application No. 2,710,269.
Notice of Allowance from U.S. Appl. No. 12/622,768 dated Jan. 24, 2013.
Office Action dated Jan. 9, 2013 from U.S. Appl. No. 12/571,411.
Office Action dated Jan. 12, 2012 from U.S. Appl, No. 12/364,369,
Office Action dated Jan. 25, 2012 from U.S. Appl, No. 12/568,087,
Office Action dated Feb. 1, 2011 from Canadian Application No. 2,691,707.
Office Action dated Feb. 9, 2012 from U.S. Appl. No. 12/364,339.
Office Action dated Feb. 28, 2012 from U.S. Appl. No. 12/539,497.
Office Action dated Mar. 2, 2012 from U.S. Appl. No. 12/639,041.
Office Action dated Mar. 13, 2012 from U.S. Appl. No. 12/364,359.
Office Action dated Mar. 20, 2012 from US. Appl. No. 12/764,164.
Office Action dated Mar. 20, 2013 from U.S. Appl. No. 12/764,164.
Office Action dated Mar. 29, 2012 from GB Application No. 1107052.1.
Office Action dated Apr. 10, 2012 from U.S. Appl. No. 12/854,370.
Office Action dated Apr. 12, 2012 from Canadian Application No. 2,691,707.
Office Action dated Apr. 13, 2012 from Australian Application No. 2008236526.
Office Action dated Apr. 17, 2012 from U.S. Appl. No. 12/607,843.
Office Action dated Apr. 25, 2012 from U.S. Appl. No. 12/363,046.
Office Action dated May 1, 2012 from Australian Application No. 2009300362.
Office Action dated May 15, 2012 from U.S. Appl. No. 12/797,243.
Office Action dated May 17, 2012 from U.S. Appl. No. 12/364,369.
Office Action dated May 24, 2011 from U.S. Appl. No. 12/363,951.
Office Action dated Jun. 1, 2012 from U.S. Appl. No. 12/855,977.
Office Action dated Jun. 4, 2012 from U.S. Appl. No. 12/568,087.
Office Action dated Jun. 4, 2012 from U.S. Appl. No. 12/703,958.
Office Action dated Jun. 8, 2012 from U.S. Appl. No. 12/639,041.
Office Action dated Jun. 13, 2012 from U.S. Appl. No. 12/639,373.
Office Action dated Jun. 16, 2010 from Canadian Application No. 2,691,707.
Office Action dated Jun. 18, 2012 from U.S. Appl. No. 12/701,468.
Office Action dated Jun. 18, 2012 from U.S. Appl. No. 12/701,496.
Office Action dated Jul. 2, 2012 from U.S. Appl. No. 12/797,262.
Office Action dated Jul. 12, 2012 from U.S. Appl, No. 12/571,411.
Office Action dated Jul. 26, 2012 from U.S. Appl. No. 12/639,041.
Office Action dated Jul. 27, 2012 from European Application No. 08743671.3.
Office Action dated Aug. 15, 2012 from Australian Application No. 2010214104.
Office Action dated Aug. 29, 2012 from U.S. Appl. No. 12/701,447.
Office Action dated Sep. 4, 2012 from U.S. Appl. No. 12/622,768.
Office Action dated Sep. 21, 2012 from U.S. Appl. No. 12/797,202.
Office Action dated Sep. 25, 2012 from Australian Application No. 2010214053.
Office Action dated Sep. 26, 2011 from Canadian Application No. 2,739,119.
Office Action dated Sep. 26, 2011 from Canadian Application No. 2,739,320.
Office Action dated Oct. 2, 2012 from Japanese Application No. 2010-502170.
Office Action dated Oct. 4, 2011 from U.S. Appl. No. 12/364,359.
Office Action dated Oct. 15, 2012 from U.S. Appl. No. 12/797,227.
Office Action dated Oct. 19, 2012 from U.S. Appl. No. 12/797,243.
Office Action dated Oct. 20, 2011 from U.S. Appl. No. 12/639,041.
Office Action dated Oct. 22, 2012 from U.S. Appl. No. 12/609,275.
Office Action dated Oct. 24, 2011 from U.S. Appl. No. 12/236,688.
Office Action dated Nov. 9, 2011 from U.S. Appl. No. 12/429,929.
Office Action dated Nov. 14, 2012 from Canadian Application No. 2,750,908.
Office Action dated Nov. 15, 2011 from Canadian Application No. 2,691,707.
Office Action dated Nov. 18, 2009 from Canadian Application No. 2,623,466, filed Mar. 4, 2008.
Office Action dated Nov. 20, 2012 from U.S. Appl. No. 12/701,468.
Office Action dated Nov. 21, 2012 from U.S. Appl. No. 12/649,535.
Office Action dated Nov. 21, 2012 from U.S. Appl. No. 12/701,496.
Office Action dated Nov. 23, 2009 from Canadian Application No. 2,623,761, filed Mar. 4, 2008.
Office Action dated Nov. 23, 2012 from U.S. Appl. No. 12/855,977.
Office Action dated Nov. 26, 2012 from U.S. Appl. No. 12/764,164.
Office Action dated Dec. 5, 2012 from U.S. Appl. No. 12/797,262.
Office Action dated Dec. 18, 2012 from U.S. Appl. No. 12/786,929.
Office Action dated Dec. 20, 2012 from U.S. Appl. No. 12/571,408.
Office Action dated Dec. 28, 2012 from U.S. Appl. No. 12/364,359.
Office Action dated Dec. 30, 2011 from U.S. Appl. No. 12/701,447.
Office Action dated Apr. 28, 2009 from U.S. Appl. No. 11/685,602.
Office Action dated Jul. 20, 2010 from U.S. Appl. No. 11/696,606.
Office Action dated Sep. 17, 2009 from U.S. Appl. No. 11/685,602.
Office Action dated Jul. 11, 2011 from Canadian Application No. 2713282.
Office Action dated Jun. 28, 2011 from Canadian Application No. 2710269.
Office Action dated Mar. 3, 2011 from Australian Application No. 2008226627.
Office Action dated Mar. 9, 2011 from Australian Application No. 2008236526.
Office Action dated Oct. 6, 2010 from Canadian Application No. 2623761.
Office Action received Jan. 18, 2013 from Japanese Application No. 2009-553688.
Olsson, Office Action dated Sep. 13, 2012 from U.S. Appl. No. 12/827,993.
Pevarski, R., Virginia Pilot Project: Technology Meets Damage Prevention, http://www.excavationsafetyonline.com/esg/guidePDFs/2009_2009_ESG_Page_9.pdf, printed on Nov. 3, 2009, 1 page.
Product Data, Hard Hat Aerosols Marking Paint 2300; Rust-oleum Netherlands B.V., Apr. 2005, 1 page, http://www.rustoleum.co.uk/downloads/2300%20Marking%20Spray.pdf.
Product Data, "Inverted Marking Chalk," Rust-oleum, Jul. 2004, 2 pages, http://www.policeone.com/pdfs/markingchalkinfo_ro.pdf.
Trimble Comprehensive Utilities, brochure, 2010, 1-6.
Trimble Navigation Limited, "H-Star Technology Explained," pp. 1-9, 2005, www.trimble.com.
Virginia Pilot Project, Incorporating GPS Technology to Enhance One-Call Damage Prevention, Phase I—Electronic White Lining Project Report, Nov. 2007, 50 pages.
Virginia Underground utility marking standard, Mar. 2004, 20 pages.
Combined Search and Examination Report dated Oct. 24, 2013 from GB Application No. 1312313.8.
Complaint for Patent Infringement dated Apr. 10, 2013, *CertusView Technologies LLC* v. *United States Infrastructure Corporation et al.*, Case No. 2:13CV182, USDC Eastern District of Virginia.
Complaint for Patent Infringement dated May 28, 2013, *CertusView Technologies LLC* v. *S&N. Locating Services, LLC et al.*, Case No. 1:13CV346, USDC Eastern District of Virginia.
Corrected Notice of Allowability dated Jun. 4, 2013 from U.S. Appl. No. 12/797,243.
Decision of Final Rejection dated Apr. 24, 2013 from Japanese Application No. 2010-502170.
European Search Report and Opinion dated Nov. 28, 2013 from EP Application No. 10808689.3.
European Search Report dated Sep. 25, 2013 from European Application No. 13177282.4.
Examination Report dated Sep. 4, 2013 from European Application No. 10732529.2.
Examination Reported dated Sep. 4, 2013 from GB Application No. GB1107165.1.
Notice of Allowability dated Jul. 5, 2013 from U.S. Appl. No. 12/701,447.
Notice of Allowability dated Jul. 10, 2013 from U.S. Appl. No. 13/795,337.
Notice of Allowance dated Jun. 17, 2013 from Canadian Application No. 2,750,908.

(56) References Cited

OTHER PUBLICATIONS

Notice of Allowance dated Jul. 10, 2013 from U.S. Appl. No. 12/571,411.
Notice of Allowance dated Aug. 1, 2013 from U.S. Appl. No. 12/571,401.
Notice of Allowance dated Aug. 2, 2013 from U.S. Appl. No. 12/797,211.
Notice of Allowance dated Aug. 27, 2013 from U.S. Appl. No. 12/855,977.
Notice of Allowance dated Sep. 17, 2013 from U.S. Appl. No. 12/859,394.
Notice of Allowance dated Sep. 25, 2013 from U.S. Appl. No. 12/364,369.
Notice of Allowance dated Sep. 25, 2013 from U.S. Appl. No. 12/571,408.
Notice of Allowance dated Jan. 14, 2014 from U.S. Appl. No. 12/797,169.
Notice of Allowance dated Dec. 23, 2013 from U.S. Appl. No. 12/364,369.
Office Action dated Jan. 9, 2014 from Canadian Application No. 2,738,968.
Office Action dated Jun. 17, 2013 from U.S. Appl. No. 12/797,262.
Office Action dated Aug. 7, 2013 from Canadian Application No. 2,739,119.
Office Action dated Aug. 7, 2013 from Canadian Application No. 2,739,320.
Office Action dated Sep. 9, 2013 from U.S. Appl. No. 13/867,521.
Office Action dated Sep. 25, 2013 from U.S. Appl. No. 13/686,262.
Office Action dated Nov. 1, 2013 from Chinese Application No. 201080045879.1 with English Translation.
Office Action dated Nov. 5, 2013 from U.S. Appl. No. 12/979,262.
Patent Examination Report No. 1 dated Jan. 24, 2014 from Australian Application No. 2012227240.
Supplemental Notice of Allowability dated Aug. 1, 2013 from U.S. Appl. No. 12/571,411.
Supplementary European Search Report dated Nov. 7, 2013 from EP Application No. 10810421.7.
Corrected Notice of Allowability dated Nov. 22, 2013 from U.S. Appl. No. 12/797,211.
Examination Report dated May 28, 2014 for European Application No. 13177282.4.
Notice of Allowance dated Feb. 26, 2014 from U.S. Appl. No. 13/686,262.
Notice of Allowance dated May 20, 2014 from U.S. Appl. No. 12/363,951.
Office Action dated Mar. 25, 2014 from Canadian Application No. 2,771,286.
Office Action dated Jul. 29, 2014 from U.S. Appl. No. 13/846,120.
Office Action dated Jun. 10, 2014 from U.S. Appl. No. 12/701,468.
Office Action dated Jul. 7, 2014 from U.S. Appl. No. 13/867,521.
Office Action dated Jul. 8, 2014 from U.S. Appl. No. 12/568,087.
Office Action dated Jul. 10, 2014 from U.S. Appl. No. 12/786,929.
Patent Examination Report dated Aug. 13, 2014 from Australian Application No. 20100282559.
Supplemental Notice of Allowability dated Jul. 21, 2014 from U.S. Appl. No. 13/363,951.
Notice of Allowance dated Jul. 17, 2014 from U.S. Appl. No. 13/644,226.
Office Action dated Jun. 26, 2014 from U.S. Appl. No. 12/701,496.
Office Action dated Aug. 12, 2014 from Japanese Patent Application No. 2013-185570.
Patent Examination Report dated Sep. 8, 2014 from Australian Application No. 2013200160.
Office Action dated Jul. 25, 2014 from Taiwan Patent Application No. 097108911.
Office Action dated Sep. 24, 2014 from U.S. Appl. No. 12/701,468.
Notice of Allowance dated Sep. 12, 2014 from U.S. Appl. No. 13/644,226.
Office Action dated Aug. 21, 2014 from Taiwan Application No. 097108912.

\* cited by examiner

HAND-HELD MARKING APPARATUS WITH LOCATION TRACKING SYSTEM AND METHODS FOR LOGGING GEOGRAPHIC LOCATION OF SAME

CROSS-REFERENCE TO RELATED APPLICATION

This application claims the benefit, under 35 U.S.C. §120, as a continuation (CON) of U.S. Non-provisional application Ser. No. 13/686,262, filed Nov. 27, 2012, entitled "Systems and Methods for Using Location Data to Electronically Display Dispensing of Markers by a Marking System or Marking Tool."

Application Ser. No. 13/686,262 claims the benefit, under 35 U.S.C. §120, as a continuation (CON) of U.S. Non-provisional application Ser. No. 12/639,041, filed Dec. 16, 2009, entitled "Systems and Methods for Using Location Data to Electronically Display Dispensing of Markers by A Marking System or Marking Tool."

Application Ser. No. 12/639,041 claims the benefit, under 35 U.S.C. §120, as a continuation (CON) of U.S. Non-provisional application Ser. No. 11/685,602, filed Mar. 13, 2007, entitled "Marking System and Method with Location and/or Time Tracking"

Each of the above-identified applications is hereby incorporated herein by reference.

BACKGROUND

Underground man-made objects, such as utility lines and pipes (hereinafter "utility lines"), are very susceptible to damage from excavation activities. Local and federal regulations require that notification be given to owners of underground utility lines in an area to be excavated before any excavation takes place. The owners of the utility lines typically must locate and mark the location of any underground utility lines.

The tasks of locating and marking underground utility lines can be performed by either the utility line owner or by third party contractors. A marking tool is typically used to mark the ground, pavement or other surfaces in order to provide a visual indication of the location of underground utilities. Paint is commonly used as the marker, and it is typically applied using a paint marking tool. The color of the paint is typically chosen based on the type of utility line being marked (e.g., red for an electrical line).

Inaccurate marking of the utility lines can result in physical damage to utility lines, property damage, and/or personal injury during the excavation process that, in turn, can expose the utility line owner or contractor to significant legal liability. When utility lines are damaged and/or when property damage or personal injury results from hitting a utility line during an excavation, the excavator may assert that the utility line was not accurately marked by the entity that carried out the marking, while the entity that marked the utility line will assert that the utility line was properly marked. Proving whether the utility line was properly marked can be difficult after the excavation, because in many cases the paint line used to mark the utility line will have been disturbed or destroyed during the excavation process.

SUMMARY

According to one aspect, a marking system may include a marker dispenser to hold and dispense markers; a location tracking system to determine location data; a processor; and a triggering system in communication with the marker dispenser and the processor to substantially simultaneously trigger the marker dispenser to dispense a marker and the processor to log the location data to identify a geographic location of the marker.

According to another aspect, a marking tool may include a housing; a marker dispenser mounted to the housing to hold and dispense markers; a location tracking system mounted to, connected to, or located within the housing to determine location data; and a triggering system mounted to, connected to, or located within the housing to substantially simultaneously trigger the marker dispenser to dispense a marker and logging of the location data from the location tracking system to identify a geographic location of the marker.

According to yet another aspect, a method may include dispensing a marker in an area to be marked, and logging at least one of location data identifying a geographic location of where the marker is dispensed or time data identifying a time at which the marker is dispensed while the marker is dispensed.

According to a further aspect, a marking tool may include means for dispensing a marker; means for determining location data or time data; and means for substantially simultaneously triggering the dispensing of the marker and logging of the location data that identifies a geographic location at which the marker is dispensed or the time data that identifies a time at which the marker is dispensed.

According to another aspect, a marking tool may include a marker dispenser to hold and dispense markers; a timing system to output time data; a processor; and a triggering system to substantially simultaneously trigger the marker dispenser to dispense a marker and the processor to log the time data to identify a time at which the marker is dispensed.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar elements. Also, the following detailed description does not limit the invention.

Figure 1:
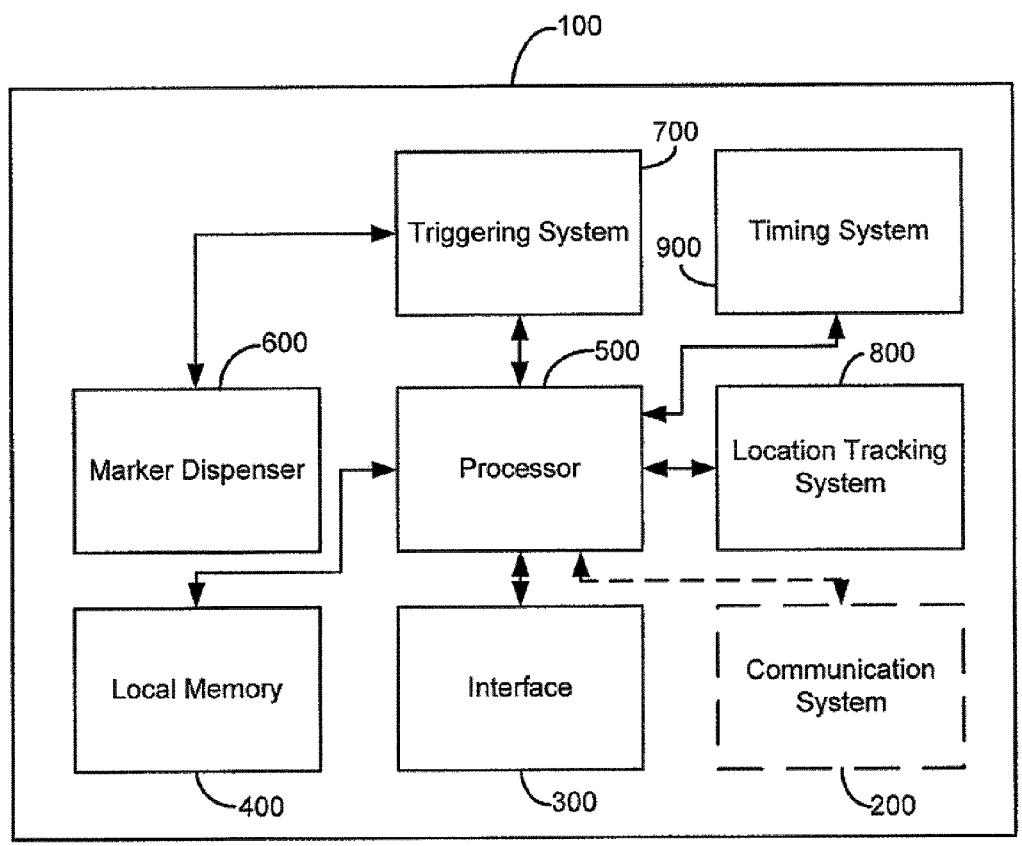
FIG. 1 is block diagram of a marking system with location and/or time tracking.

FIG. 1 is block diagram of a marking system 100 with location and/or time tracking. The system 100 may include an optional communication system 200, interface 300, local memory 400, processor 500, marker dispenser 600, triggering system 700, location tracking system 800, and timing system 900. In other implementations, system 100 may include fewer, different, or additional elements.

In one implementation, the system 100 may be used to accurately record the geographic location where markers are dispensed using data from the location tracking system 800 and/or the time at which the markers are dispensed using data from the timing system 900. In one exemplary application of the system 100, the location of markers used to mark underground utility lines and/or the time at which the markers are dispensed can be accurately and reliably recorded. The marker that is used to mark underground utility lines may include a liquid, such as paint. However, other types of markers, such as objects (e.g., flags, stakes, etc.), may be used in other implementations.

The location tracking system 800 may include any device that can determine its geographic location to a certain degree of accuracy, such as a global positioning system (GPS) or a global navigation satellite system (GNSS) receiver. In another implementation, the location tracking system 800 can include a device that determines location using another technique, such as tower (e.g., cellular tower) triangulation.

The location tracking system 800 may receive location tracking signals (e.g., GPS signals) and determine its location based on these signals. In one implementation, the location tracking system 800 may be capable of determining its location within less than approximately thirty centimeters.

The timing system 900 may include any device that can output time data to some level of accuracy (e.g., accuracy to the minute, the second, the millisecond, etc.). In one implementation, the timing system 900 may be capable of generating the time data itself. In this situation, the timing system 900 may take the form of a clock. In another implementation, the timing system 900 may receive the time data from another timing system. In this situation, the timing system 900 may take the form of a receiver. In some situations, it may be beneficial for the timing system 900 to be synchronized to another timing system.

A user can control the operation of the system 100 via interface 300. In one implementation, interface 300 may include a touch screen interface that can provide various operational controls and status indicators of the system 100, and can allow the user to navigate the controls by touching particular areas of the screen. In another implementation, interface 300 may include another form of input and/or output, such as, for example, a display for displaying information and a keypad for entering information.

The triggering system 700 may trigger the logging of location and/or time data and the dispensing of markers. In one implementation, the system 100 may log location and/or time data only when a marker is being dispensed by the marker dispenser 600. This may be accomplished via a triggering mechanism that, when actuated by the user, triggers both the marker dispenser 600 and the logging of location and/or time data. The location data may be received from the location tracking system 800, and logged and stored in local memory 400 by the processor 500. The time data may be received from the timing system 900, and logged and stored in local memory 400 by the processor 500.

The marker dispenser 600 may hold the markers and may also contain an actuation mechanism (not shown in FIG. 1) that causes the markers to be dispensed. As described above, the markers dispensed by the marker dispenser 600 may include a liquid (e.g., paint) or an object (e.g., flags or stakes). Details of the marker dispenser 600 will be discussed in more detail below.

In operation, a user may engage a triggering mechanism in the triggering system 700 (explained in more detail below) in order to dispense the markers. When the triggering mechanism is engaged, the triggering system 700 may also initiate logging of location data received from the location tracking system 800 and/or time data received from the timing system 900. This may be done by sending a signal to the processor 500, which may cause processor 500 to store a log of the location and/or time data in local memory 400.

Communication system 200 may include an interface for transmitting data to and/or receiving data from one or more external devices and/or systems located either local to or remote from the system 100. Communication system 200 may include any type of interface, such as an interface for communicating via Ethernet, Bluetooth, Wifi, radio frequency (RF), a wide area network (WAN), or another type of network or protocol.

In one implementation, communication system 200 may send location and/or time data logs stored in local memory 400 to an external device/system and/or receive information from an external device/system. The location data logs may be used by the external device/system to accurately track the location where the markers were dispensed. The time data logs may be used by the external device/system to accurately track a time at which the markers were dispensed.

System 100, as broadly described herein, may be particularly suited for incorporation into marking tools for marking underground utilities. As discussed above, a marking tool is used to mark the ground, pavement or other surfaces in order to provide a visual indication of the location of underground utilities. The type of marker that may be used includes paint that may be supplied in aerosol cans that are oriented axially with respect to the long axis of the aerosol cans. The marking tool enables a user to walk or stand erect while dispensing the markers.

Figure 2:
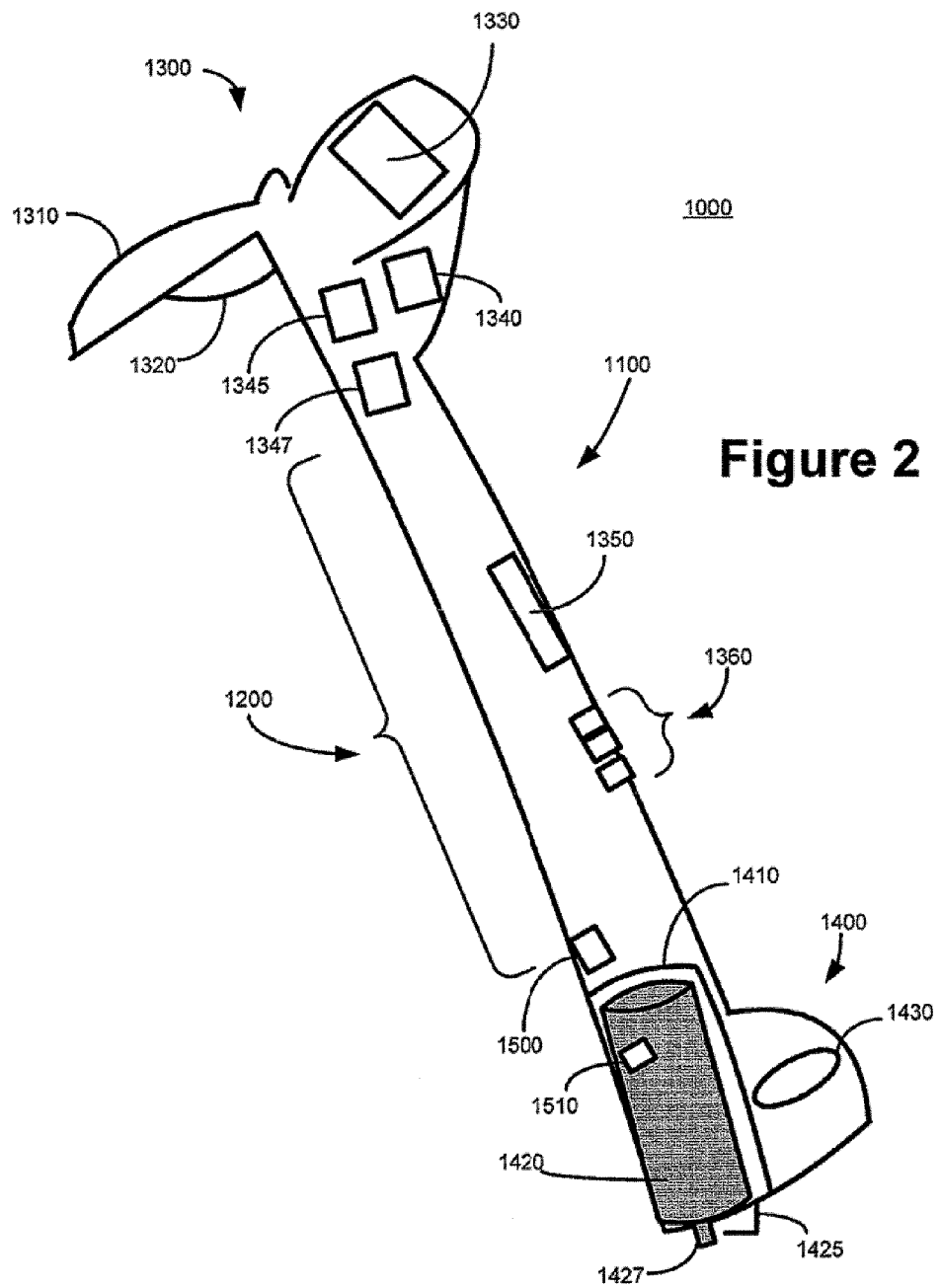
FIG. 2 is a schematic diagram of a marking tool with location and/or time tracking.

FIG. 2 is a schematic diagram of a marking tool 1000 with location and/or time tracking. For the description to follow, assume that the marking tool 1000 uses paint as the marker. However, it should be appreciated that any other marker, such as another type of liquid, flags, stakes, etc., may be used in other implementations.

The marking tool 1000 may include a housing 1100 with an elongated center housing portion 1200, a top housing portion 1300 and a bottom housing portion 1400. The housing 1100 may be formed of any at least semi-rigid material, and may be formed of a lightweight material such as aluminum or plastic.

A paint canister holder 1410 may be attached to the bottom housing portion 1400. The paint canister holder 1410 may include an open-ended tubular structure that is attached to the bottom housing portion 1400 by any suitable attachment mechanisms, such as rivets, adhesive, mechanical fasteners or the like. The paint canister holder 1410 may be formed of any material such as injection-molded plastic, formed sheet metal or any other appropriate material that may be fabricated into an open tubular configuration or any other configuration that will serve to support a paint canister 1420 with the paint canister axis substantially parallel to the housing 1100.

The housing 1100 may optionally include a tag (e.g., radio frequency identification (RFID)) reader 1500 that may read tags (e.g., RFID tags). The tag reader 1500 may include an antenna (not shown) that emits radio waves and the tag may respond by sending back its data. A tag 1510 can be attached to the paint canister 1420 and can incorporate data, readable by the tag reader 1500, that corresponds to characteristics of the paint (e.g., paint color). Other examples of marker characteristics may include, but are not limited to, the type of marker. The data read by the tag reader 1500 can then be sent to a processor 1340 for a determination of the corresponding characteristic. The corresponding characteristic can then displayed by a display 1330, logged, and/or sent to an external device or system for processing. The tag reader 1500 may be mounted anywhere on the housing or on the paint canister 1410. However, the tag reader 1500 does not have to be mounted anywhere on the marker tool itself. For example, the tag reader 1500 may be carried by a user. In general, the tag reader 1500 may be mounted or located at any location, as long as it can receive data transmitted from the tag 1510.

An actuation mechanism 1425 may be attached to the bottom housing portion 1400 at a location from which it can actuate the nozzle 1427 of the paint canister 1420. The actuation mechanism 1425 may include a rigid material that depresses the nozzle 1427 when actuated. However, any mechanism may be used to actuate the nozzle 1427 of the paint canister 1420.

A handle 1310 may be provided at the top housing portion 1300. The handle 1310 may be formed of injection-molded plastic or any other appropriate material, and may be attached to the top housing portion 1300 by rivets, adhesive, or any other suitable means. A mechanical trigger 1320 may be provided on the top housing portion 1300. The mechanical trigger 1320 may be located on the handle 1310 and attached using any suitable means.

The display 1330 may be provided on the top housing portion 1300. The display 1330 may include a touch-screen display for displaying information to a user, as well as acting as an input device. The processor 1340 and a local memory 1345 are located in the housing 1100. In one implementation, the processor 1340 and local memory 1345 may be located in the top housing portion 1300 so as to be in close proximity to the display 1330 and mechanical trigger 1320. In another implementation, the processor 1340 and local memory 1345 may be located elsewhere within the housing 1100.

The timer 1347 may be provided on the top housing portion 1300. Alternatively, the timer 1347 may be located elsewhere within housing 1100. The timer 1347 may output time data to the processor 1340.

A wireless communication antenna 1350 may be located on the housing 1100, and used to transmit data, such as location and/or time data logs stored in local memory 1345, to an external device/system and/or to receive information from an external device/system.

A location tracking system receiver 1430 for receiving location tracking signals (e.g., GPS signals) may be mounted inside the housing 1100. In the embodiment of FIG. 2, the location tracking system receiver 1430 may be located at the bottom housing portion 1400. In another embodiment, the location tracking system receiver 1430 may be located elsewhere within or on the housing 1100 at a location that optimizes signal reception. However, the location tracking system receiver 1430 does not have to be mounted anywhere on the marker tool itself. For example, the location tracking system receiver 1430 may be carried by a user. In general, the location tracking system receiver 1430 may be mounted or located at any location, as long as it can receive the location tracking signals.

The tool 1000 may also optionally include one or more input/output ports 1360, such as USB, SCSI, Firewire, Ethernet and/or other ports, for interfacing with other equipment and/or computers.

In operation, a user may operate the paint marking tool 1000 while standing or walking in an upright manner. A user may control the operation of the tool 1000 via display 1330, mechanical trigger 1320, and/or a wireless interface that may be provided via wireless communication antenna 1350 and/or input/output ports 1360.

The various operational controls and status indicators of the tool 1000 are displayed on display 1330, and the user can also navigate the controls by touching particular areas of the display 1330. Although a touch-screen display is one form of the display 1330, any other type of display or interface may be used such as, for example, a display for displaying information and a keypad for entering information. The user may use the display 1330 to substantially simultaneously trigger the logging of the location and/or time data, and the dispensing of paint.

The mechanical trigger 1320 may trigger the logging of the location data (e.g., GPS coordinate) and/or the time data, and the dispensing of paint. In one implementation, the tool 1000 may log the location and/or time data only when paint is being dispensed. This may be accomplished by utilizing a mechanical trigger 1320 that, when actuated by the user, substantially simultaneously triggers both the actuation mechanism 1425 for the paint canister 1420 and the logging of the location and/or time data by the processor 1340. The processor 1340 may receive the location data from the location tracking system receiver 1430, the time data from the timer 1347, and store the location and/or time data in local memory 1345.

The mechanical trigger 1320 can trigger the actuation mechanism 1425 via a mechanical connection between the trigger 1320 and the actuation mechanism 1425. For example, the actuation mechanism 1425 can be a rigid material that is connected to the mechanical trigger 1320 via a mechanical linkage (not shown), in which case depressing the mechanical trigger 1320 may cause the actuation mechanism to apply pressure to the nozzle 1427 of the paint canister 1420. However, the mechanical trigger 1320 may also, or alternatively, trigger the actuation mechanism 1425 via an electronic connection. The electronic connection may be a hardwired connection or a wireless connection. If the connection between the mechanical trigger 1320 and the actuation mechanism 1425 is an electronic connection, the actuation mechanism 1425 may include a mechanism for generating the force necessary to depress the nozzle 1427 of the paint canister 1420.

The wireless interface may be capable of capturing signals that reflect a user's intent. For example, the wireless interface may include a microphone that can capture a user's intent by capturing the user's audible commands. Alternatively, the wireless interface may interact with a device that monitors a condition of the user, such as eye movement, brain activity, or heart rate. In either event, the wireless interface may generate signals that may be sent to the processor 1340 for processing. The processor 1340 may use the signals to substantially simultaneously trigger the logging of the location and/or time data, and the dispensing of paint.

Figure 3:
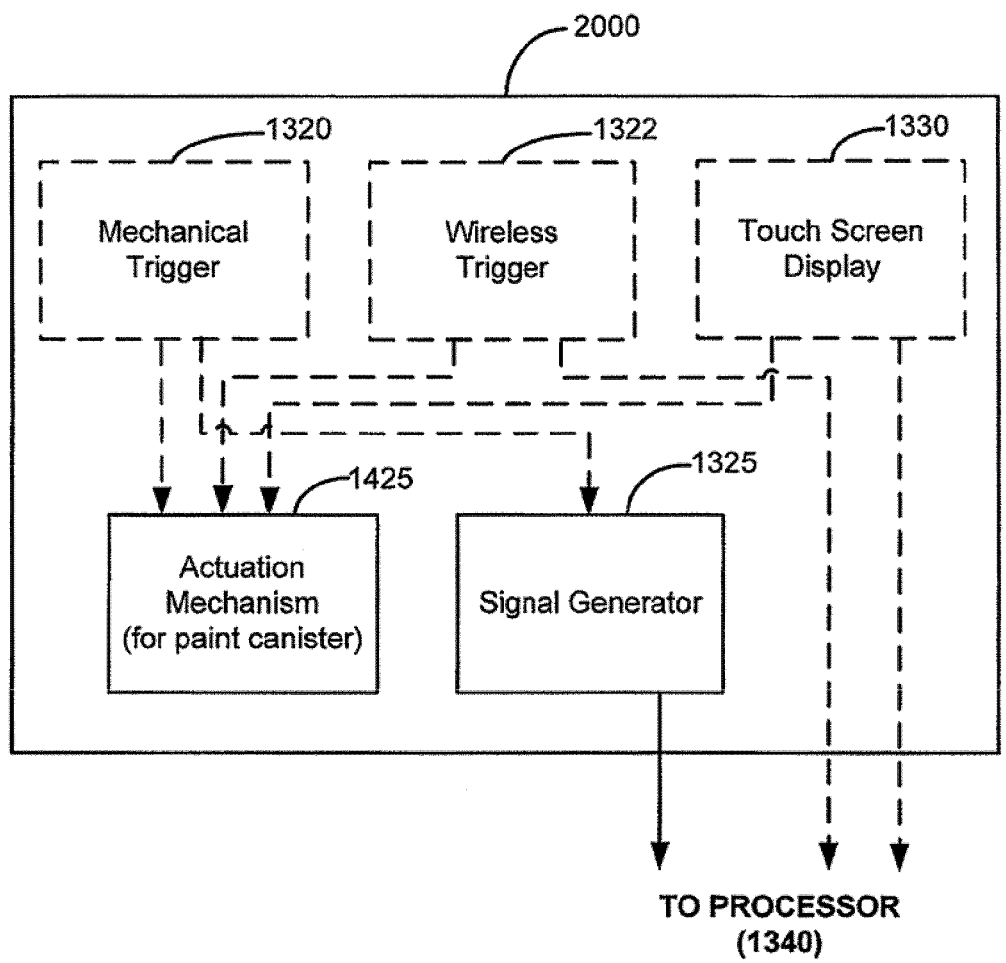
FIG. 3 is a schematic diagram of a triggering system used in the marking tool of FIG. 2.

FIG. 3 is a diagram of one embodiment of a triggering system 2000 used in the marking tool 1000 of FIG. 2. As shown in FIG. 3, the triggering system 2000 may include the mechanical trigger 1320, a wireless trigger 1322, and/or a touch screen display 1330, the mechanical actuation device 1425, and a signal generator 1325.

In operation, a user may substantially simultaneously trigger the logging of location and/or time data and the dispensing of paint by actuating the mechanical trigger 1320. The logging of location and/or time data and the dispensing of paint may also, or alternatively, be triggered by a trigger signal from wireless trigger 1322 or by choosing a command that is displayed on the touch screen display 1330. It should be appreciated that triggering system 2000 may include a mechanical trigger 1320, a trigger signal from wireless trigger 1322, a trigger command on a touch screen display 1330 or a combination of a mechanical trigger 1320, a trigger signal from wireless trigger 1322, and/or a trigger command on a touch screen display 1330 for initiating the logging of location and/or time data and the dispensing of paint.

When a user actuates the mechanical trigger 1320, the mechanical actuation device 1425 and the signal generator 1325 are both activated. The mechanical actuation device 1420 actuates the nozzle 1427 of the paint canister 1420, thus dispensing paint out of the paint canister 1420. The signal generator 1325, when activated, sends a start log signal to the processor 1340 for triggering the logging of location and/or time data. For example, the start log signal may instruct the processor 1340 to read, or otherwise obtain, location data from location tracking system 800 (FIG. 1) or the location tracking system receiver 1430 (FIG. 2), and store the location data in local memory 400 (FIG. 1) or 1345 (FIG. 2). In addition, or alternatively, the start log signal may instruct the processor 1340 to read, or otherwise obtain, time data from timing system 900 (FIG. 1) or the timer 1347 (FIG. 2), and store the time data in local memory 400 (FIG. 1) or 1345 (FIG. 2).

The mechanical trigger 1320 can activate the mechanical actuation device 1420 via a mechanical connection, e.g., a mechanical linkage, between the mechanical trigger 1320 and the mechanical actuation device 1425. Alternatively, the mechanical trigger 1320 can activate the mechanical actuation device 1420 via a wired or wireless electronic connection between the mechanical trigger 1320 and the mechanical actuation device 1425.

If a trigger signal from wireless trigger 1322 is used by the user to initiate location and/or time data logging and paint dispersal, the wireless trigger 1322 may send a signal to both the mechanical actuation device 1425 and the processor 1340. The signal sent to the mechanical actuation device 1425 by the wireless trigger 1322 may result in the actuation of the nozzle 1427 of the paint canister 1420 by the mechanical actuation device 1425. The signal sent to the processor 1340 by the wireless trigger 1322 may trigger the logging of the location and/or time data. The signals sent by the wireless trigger 1322 to the mechanical actuation device 1425 and the processor 1340 may be sent via a wired or wireless connection.

If a command on the touch screen display 1330 is used by the user to initiate location and/or time data logging and paint dispersal, the touch screen 1330 sends a signal to both the mechanical actuation device 1425 and the processor 1340. The signal sent to the mechanical actuation device 1425 by the touch screen display 1330 may result in the actuation of the nozzle 1427 of the paint canister 1420 by the mechanical actuation device 1425. The signal sent to the processor 1340 by the touch screen display 1330 may trigger the logging of the location and/or time data. The signals sent by the touch screen display 1330 to the mechanical actuation device 1425 and the processor 1340 may be sent via a wired or wireless connection.

The logged location and/or time data may be used by an external device and/or system to track the dispensing of markers with a high degree of accuracy. The logged location and/or time data may be useful when disputes arise regarding whether the dispensed markers were placed in the correct location. Also, the logged data may be used to visually depict (e.g., in real time as the dispensing occurs) or reconstruct (e.g., at a later time after the dispensing is complete) the dispensing of the markers on an electronic representation of the area that is currently being marked or was previously marked.

The processors 500 and 1340 can be general purpose computers. Alternatively, they can also be special purpose computers, programmed microprocessors or microcontrollers and peripheral integrated circuit elements, ASICs or other integrated circuits, hardwired electronic or logic circuits such as discrete element circuits, programmable logic devices such as FPGA, PLD, PLA or PAL or the like. In general, any device capable of executing code can be used to implement processors 500 and 1340. Local memories 400 and 1345 can be implemented with any type of electronic memory and/or storage device using any type of media, such as magnetic, optical or other media.

The foregoing description is not intended to be exhaustive or to limit the description to the precise form disclosed. Modifications and variations are possible in light of the above disclosure or may be acquired from practice of the invention.

It will be apparent that aspects, as described above, may be implemented in many different forms of software, firmware, and hardware in the implementations illustrated in the figures. The actual software code or specialized control hardware used to implement these aspects is not limiting of the description provided herein. Thus, the operation and behavior of the aspects were described without reference to the specific software code—it being understood that software and control hardware can be designed to implement the aspects based on the description herein.

The term "substantially simultaneously," as used herein, is intended to mean simultaneously or approximately simultaneously.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The invention claimed is:

1. An apparatus to facilitate collection of information regarding underground utilities while walking or standing erect on ground, pavement or other surface above the underground facilities, the apparatus comprising:
    an elongated hand-held housing;
    a paint canister holder coupled to the elongated hand-held housing to hold a marker dispenser configured to dispense at least one marker;
    a location tracking system, disposed within or coupled to the elongated hand-held housing, including a receiver to determine a geographic location of the location tracking system;
    a memory disposed within or coupled to the elongated hand-held housing; and
    a processor, disposed within or coupled to the elongated hand-held housing and communicatively coupled to the location tracking system and the memory, to receive from the location tracking system location data relating to the geographic location of the location tracking system and to store in the memory the received location data, and to further receive information relating to at least one characteristic of the at least one marker and store in the memory at least some of the information relating to the at least one characteristic of the at least one marker when the marker dispenser is disposed in the paint canister holder.

2. The apparatus of claim 1, further comprising:
    a triggering system communicatively coupled to the location tracking system and the processor to trigger logging in the memory of the location data relating to the geographic location of the location tracking system.

3. The apparatus of claim 2, wherein the triggering system further triggers logging in the memory of time data relating to actuation of the triggering system.

4. The apparatus of claim 2, further comprising the marker dispenser disposed in the paint canister holder, wherein the triggering system is communicatively coupled to the marker dispenser to cause a dispensing of the at least one marker upon actuation of the triggering system.

5. The apparatus of claim 4, wherein the triggering system triggers the logging in the memory of the location data only when the at least one marker is dispensed from the marker dispenser.

6. The apparatus of claim 4, wherein the triggering system further triggers logging in the memory of time data when the at least one marker is dispensed from the marker dispenser.

7. The apparatus of claim 4, wherein the triggering system further triggers logging in the memory of information relating to at least one characteristic of the at least one marker.

8. The apparatus of claim 1, further comprising the marker dispenser disposed in the paint canister holder.

9. The apparatus of claim 1, further comprising:
a triggering system communicatively coupled to the processor to trigger logging in the memory of time data relating to actuation of the triggering system.

10. The apparatus of claim 1, further comprising:
a communication system communicatively coupled to the processor and including a wireless interface to transmit a signal from the apparatus, wherein the signal transmitted by the wireless interface represents the location data relating to the geographic location of the location tracking system.

11. A method, comprising:
A) using a hand-held apparatus to walk or stand erect over ground, pavement or other surface above at least one underground utility line, the hand-held apparatus comprising:
an elongated housing;
a paint canister holder coupled to the elongated housing to hold a marker dispenser configured to dispense at least one marker;
a location tracking system, disposed within or coupled to the elongated housing, including a receiver to determine a geographic location of the hand-held apparatus;
a memory disposed within or coupled to the elongated housing; and
a processor, disposed within or coupled to the elongated housing and communicatively coupled to the location tracking system and the memory;
B) receiving, by the processor from the location tracking system, location data relating to the geographic location of the hand-held apparatus as the hand-held apparatus is used in A); and
C) storing in the memory the received location data;
D) receiving, by the processor, information relating to at least one characteristic of the at least one marker when the marker dispenser is disposed in the paint canister holder; and
E) storing in the memory at least some of the information relating to the at least one characteristic of the at least one marker upon receiving the information in D).

12. The method of claim 11, wherein the hand-held apparatus further comprises a triggering system communicatively coupled to the location tracking system and the processor, and wherein the method further comprises:
D) actuating the triggering system to log in the memory the location data relating to the geographic location of the hand-held apparatus.

13. The method of claim 12, further comprising logging in the memory time data relating to actuation of the triggering system in D).

14. The method of claim 12, wherein the hand-held apparatus further comprises the marker dispenser disposed in the paint canister holder, and wherein the method further comprises:
dispensing the at least one marker from the marker dispenser upon actuation of the triggering system in D).

15. The method of claim 14, wherein D) comprises logging in the memory the location data only when the at least one marker is dispensed from the marker dispenser.

16. The method of claim 14, further comprising logging in the memory of time data when the at least one marker is dispensed from the marker dispenser.

17. The method of claim 14, further comprising logging in the memory of information relating to at least one characteristic of the at least one marker.

18. The method of claim 11, wherein the hand-held apparatus further comprises a communication system communicatively coupled to the processor and including a wireless interface, and wherein the method further comprises:
D) transmitting from the wireless interface a signal representing the location data relating to the geographic location of the hand-held apparatus.

19. The method of claim 11, wherein the hand-held apparatus further comprises the marker dispenser disposed in the paint canister holder, and wherein the method further comprises:
D) receiving, by the processor, information relating to at least one characteristic of the at least one marker; and
E) storing in the memory at least some of the information relating to the at least one characteristic of the at least one marker.

20. The method of claim 11, wherein the hand-held apparatus further comprises a triggering system communicatively coupled to the processor, and wherein the method further comprises:
D) actuating the triggering system to log in the memory time data relating to actuation of the triggering system.

21. An apparatus to facilitate collection of information regarding underground utilities while walking or standing erect on ground, pavement or other surface above the underground facilities, the apparatus comprising:
an elongated hand-held housing;
a paint canister holder coupled to the elongated hand-held housing to hold a marker dispenser configured to dispense at least one marker;
a location tracking system, disposed within or coupled to the elongated hand-held housing, including a receiver to determine a geographic location of the location tracking system;
a memory disposed within or coupled to the elongated hand-held housing;
a processor, disposed within or coupled to the elongated hand-held housing and communicatively coupled to the location tracking system and the memory, to receive from the location tracking system location data relating to the geographic location of the location tracking system and to store in the memory the location data, and to receive information relating to at least one characteristic of the at least one marker and store in the memory at least some of the information relating to the at least one characteristic of the at least one marker when the marker dispenser is disposed in the paint canister holder;
a triggering system communicatively coupled to the location tracking system and the processor to trigger logging in the memory of the location data relating to the geographic location of the location tracking system upon actuation of the triggering system; and
a communication system communicatively coupled to the processor and including a wireless interface to transmit a signal from the apparatus, wherein the signal transmitted by the wireless interface represents the location data relating to the geographic location of the location tracking system.

* * * * *